(12) United States Patent
Takeda et al.

(10) Patent No.: US 9,958,846 B2
(45) Date of Patent: May 1, 2018

(54) DATA PROCESSING DEVICE

(71) Applicant: DENSO CORPORATION, Kariya, Aichi-pref. (JP)

(72) Inventors: Shingo Takeda, Kariya (JP); Ichiro Yoshida, Takahama (JP); Kiyohiko Sawada, Nagoya (JP); Hidetaka Tanaka, Kariya (JP); Kiyohito Narita, Takahama (JP); Motoki Kanamori, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 222 days.

(21) Appl. No.: 14/773,069

(22) PCT Filed: Feb. 27, 2014

(86) PCT No.: PCT/JP2014/001054
§ 371 (c)(1),
(2) Date: Sep. 4, 2015

(87) PCT Pub. No.: WO2014/136406
PCT Pub. Date: Sep. 12, 2014

(65) Prior Publication Data
US 2016/0011576 A1   Jan. 14, 2016

(30) Foreign Application Priority Data

Mar. 8, 2013 (JP) ................................. 2013-046604
Jul. 3, 2013 (JP) ................................. 2013-139901

(51) Int. Cl.
*G05B 15/02* (2006.01)
*B62D 15/02* (2006.01)
(Continued)

(52) U.S. Cl.
CPC ......... *G05B 15/02* (2013.01); *B60W 50/0205* (2013.01); *B60W 50/045* (2013.01);
(Continued)

(58) Field of Classification Search
CPC .... G06F 11/07; G06F 11/793; G06F 11/1654; G06F 11/277; G06F 11/30;
(Continued)

(56) References Cited

U.S. PATENT DOCUMENTS 4,817,091 A * 3/1989 Katzman ............. G06F 12/1458
711/E12.093
7,814,307 B2 * 10/2010 Powell ................. G06F 9/45533
713/1
(Continued)

FOREIGN PATENT DOCUMENTS

JP    2006174074 A    6/2006
JP    2006277115 A    10/2006
(Continued)

OTHER PUBLICATIONS

International Search Report and Written Opinion (in Japanese with English Translation) for PCT/JP2014/001054, dated Apr. 28, 2014; ISA/JP.

*Primary Examiner* — Jaweed A Abbaszadeh
*Assistant Examiner* — Brian J Corcoran
(74) *Attorney, Agent, or Firm* — Harness, Dickey & Pierce, P.L.C.

(57) ABSTRACT

A data processing device includes: a first controller requiring a first activation time; a second controller requiring a second activation time, which is shorter than the first activation time; and a data processor for switching a mode, in which data is processed, between a first processing mode without collaboration with the first controller, and a second processing mode in collaboration with the first controller. The data
(Continued)

processor processes data in the first processing mode after completing the activation of the second controller and before completing the activation of the first controller; processes data in the second processing mode after completing the activation of the first controller; and processes data in the first processing mode after a fault occurs in the first controller.

17 Claims, 10 Drawing Sheets

(51) Int. Cl.
*G06F 11/30* (2006.01)
*B60W 50/02* (2012.01)
*B60W 50/04* (2006.01)
*B60W 50/00* (2006.01)

(52) U.S. Cl.
CPC ............ *B62D 15/029* (2013.01); *G06F 11/30* (2013.01); *B60W 2050/0008* (2013.01)

(58) Field of Classification Search
CPC ............ G06F 11/3003; G06F 11/3013; G06F 15/177; G06F 9/4405; G06F 9/4406; G06F 9/4408; G06F 9/441; G06F 11/16; G06F 15/16; G06F 17/30781; G06F 17/00; G06F 9/4401; G06F 9/4443
See application file for complete search history.

(56) References Cited

U.S. PATENT DOCUMENTS

| | | | |
|---|---|---|---|
| 2005/0081115 A1 | 4/2005 | Cheng et al. | |
| 2006/0095756 A1* | 5/2006 | Erforth | G01C 21/36 713/2 |
| 2009/0198407 A1* | 8/2009 | Sakai | B60W 50/0205 701/29.1 |
| 2010/0017543 A1* | 1/2010 | Preston | B60R 25/00 710/16 |
| 2010/0174895 A1 | 7/2010 | Pierce et al. | |
| 2011/0246820 A1 | 10/2011 | Murao | |
| 2012/0044351 A1* | 2/2012 | Kook | B60K 35/00 348/148 |
| 2012/0162427 A1* | 6/2012 | Lynam | B60R 1/00 348/148 |
| 2014/0223158 A1* | 8/2014 | Zhou | G06F 9/4405 713/2 |

FOREIGN PATENT DOCUMENTS

| | | |
|---|---|---|
| JP | 2007507034 A | 3/2007 |
| JP | 2007088933 A | 4/2007 |
| JP | 2009003592 A | 1/2009 |
| JP | 2009175904 A | 8/2009 |
| JP | 2009284023 A | 12/2009 |
| JP | 2011022934 A | 2/2011 |
| JP | 2012256091 A | 12/2012 |
| WO | WO-2011114493 A1 | 9/2011 |

* cited by examiner

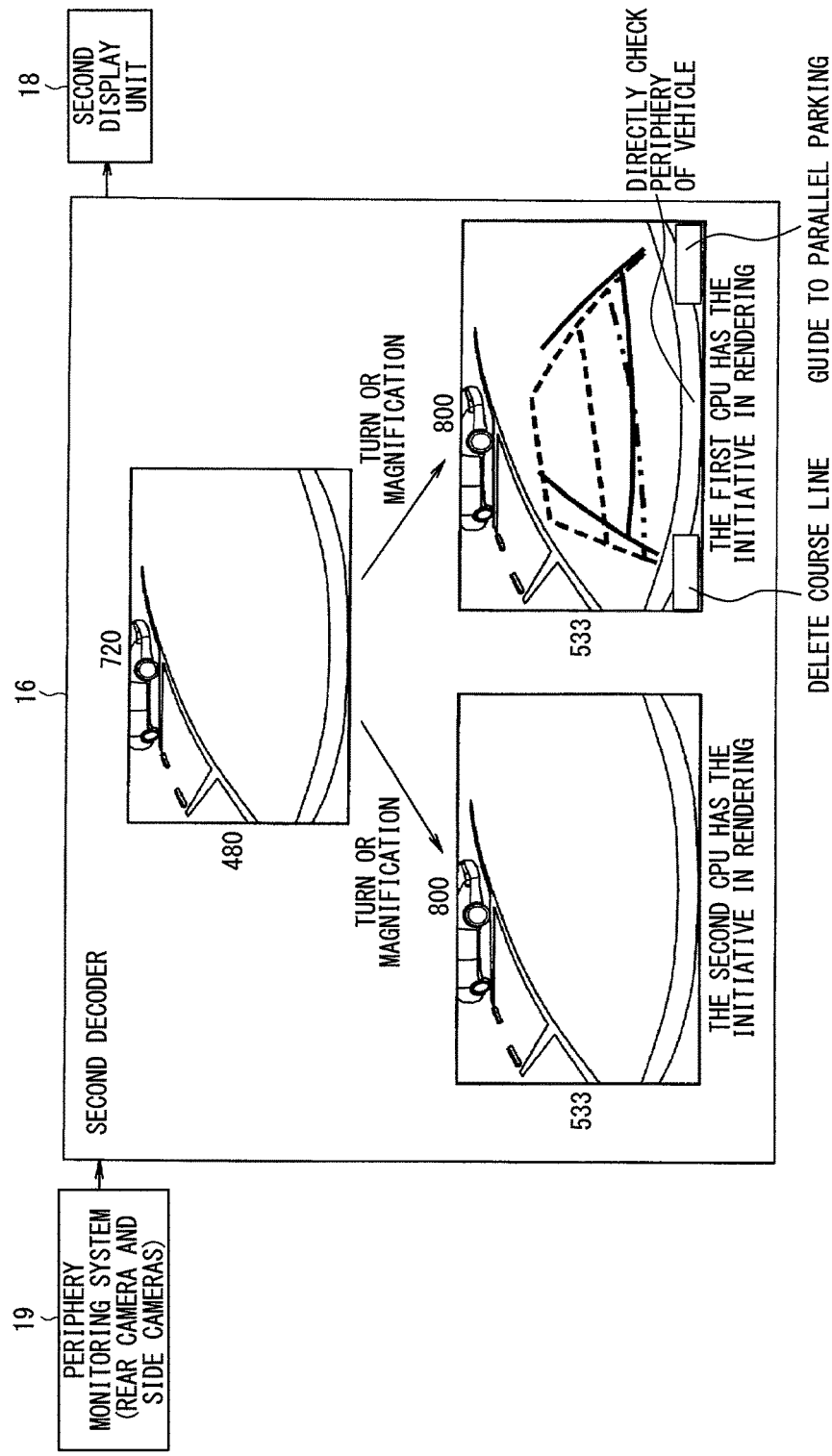

DATA PROCESSING DEVICE

CROSS REFERENCE TO RELATED APPLICATIONS

This application is a U.S. National Phase Application under 35 U.S.C. 371 of International Application No. PCT/JP2014/001054 filed on Feb. 27, 2014 and published in Japanese as WO 2014/136406 A1 on Sep. 12, 2014. This application is based on and claims the benefit of priority from Japanese Patent Application No. 2013-46604 filed on Mar. 8, 2013 and Japanese Patent Application No. 2013-139901 filed on Jul. 3, 2013. The entire disclosures of all of the above applications are incorporated herein by reference.

TECHNICAL FIELD

The present disclosure relates to a data processing device including a first controller that takes a first activation time from the moment when operating power is fed to the first controller and the first controller begins activation to the moment when the first controller completes activation, and a second controller that takes a second activation time, which is shorter than the first activation time, from the moment when the operating power is fed to the second controller and the second controller begins activation to the moment when the second controller completes activation.

BACKGROUND ART

In the past, data processing devices have been available as a variety of pieces of electronic equipment, for example, a personal computer and a smartphone. In the data processing device, it desirably takes a short activation time from the moment when operating power is fed to a controller and the controller begins activation to the moment when the controller completes activation (the controller becomes able to run a program). By shortening the activation time, a feature of, for example, displaying an initial screen image can be immediately presented. Patent Document 1 discloses a technology for shortening an activation time by preparing a plurality of pieces of controller, dividing a sequence (i.e., procedure), which is needed for activation, into portions, allocating the portions to the pieces of controller, and allowing the pieces of controller to perform the allocated portions of the sequence in parallel. Patent Document 2 discloses a technology for shortening an activation time by preparing a sub (dedicated) controller, which takes a shorter activation time than main controller does, in place of the main controller that takes a longer activation time.

PRIOR ART LITERATURES

Patent Literature

Patent Document 1: JP 2009-175904 A
Patent Document 2: JP 2009-284023 A

SUMMARY OF THE INVENTION

However, according to the technology disclosed in Patent Document 1, when a volume of a sequence to be executed is enormous, for example, when an operating system (OS) and many distributed application programs are read concurrently, even if portions of the sequence are executed in parallel, there is a limitation in shortening an activation time. In addition, preparing a plurality of pieces of controllers is not practical in terms of a cost and configuration. According to the technology disclosed in Patent Document 2, after a main controller activates, the main controller takes over processing of presenting a feature from the sub controller. A load on the main controller is increased. If a fault (for example, freezing) occurs in the main controller, the feature cannot be presented continuously.

The present disclosure addresses the foregoing situation. An object of the present disclosure is to provide a data processing device that includes a first controller and a second controller which are different from each other in an activation time to be taken from the moment when operating power is fed and activation is begun to the moment when activation is completed, and that can immediately present a feature and can continuously present the feature.

A data processing device in accordance with an aspect of the present disclosure includes a first controller that takes a first activation time from the moment operating power is fed to the first controller and the first controller begins activation to the moment the first controller completes activation, a second controller that takes a second activation time, which is shorter than the first activation time, from the moment when the operating power is fed to the second controller and the second controller begins activation to the moment when the second controller completes activation, and a data processor. The data processor can switch a first processing mode, in which data is processed without collaboration with the first controller, and a second processing mode in which data is processed in collaboration with the first controller.

After the second controller completes activation, before the first controller completes activation, the data processor processes data in the first processing mode. Accordingly, when the second controller completes activation, even if the first controller has not completed activation, a result of processing of data performed in collaboration with the first controller cannot be outputted. However, since a result of processing of data performed without collaboration with the first controller is outputted, a feature can be immediately presented. When the first controller completes activation, the data processor processes data in the second processing mode. Accordingly, when the first controller completes activation, since the result of processing of data performed in collaboration with the first controller is outputted, the feature can be continuously presented. After the first controller completes activation, if a fault occurs in the first controller, the data processor processes data in the first processing mode. Accordingly, even if an fault occurs in the first controller, since the result of processing of data performed without collaboration with the first controller in which the fault has occurred is outputted, the feature can be continuously presented.

BRIEF DESCRIPTION OF DRAWINGS

The above and other objects, features and advantages of the present disclosure will become more apparent from the following detailed description made with reference to the accompanying drawings. In the drawings:

FIG. 9 is a diagram showing a mode in which a picture is adjusted;

EMBODIMENTS FOR CARRYING OUT INVENTION

First Embodiment

Figure 1:
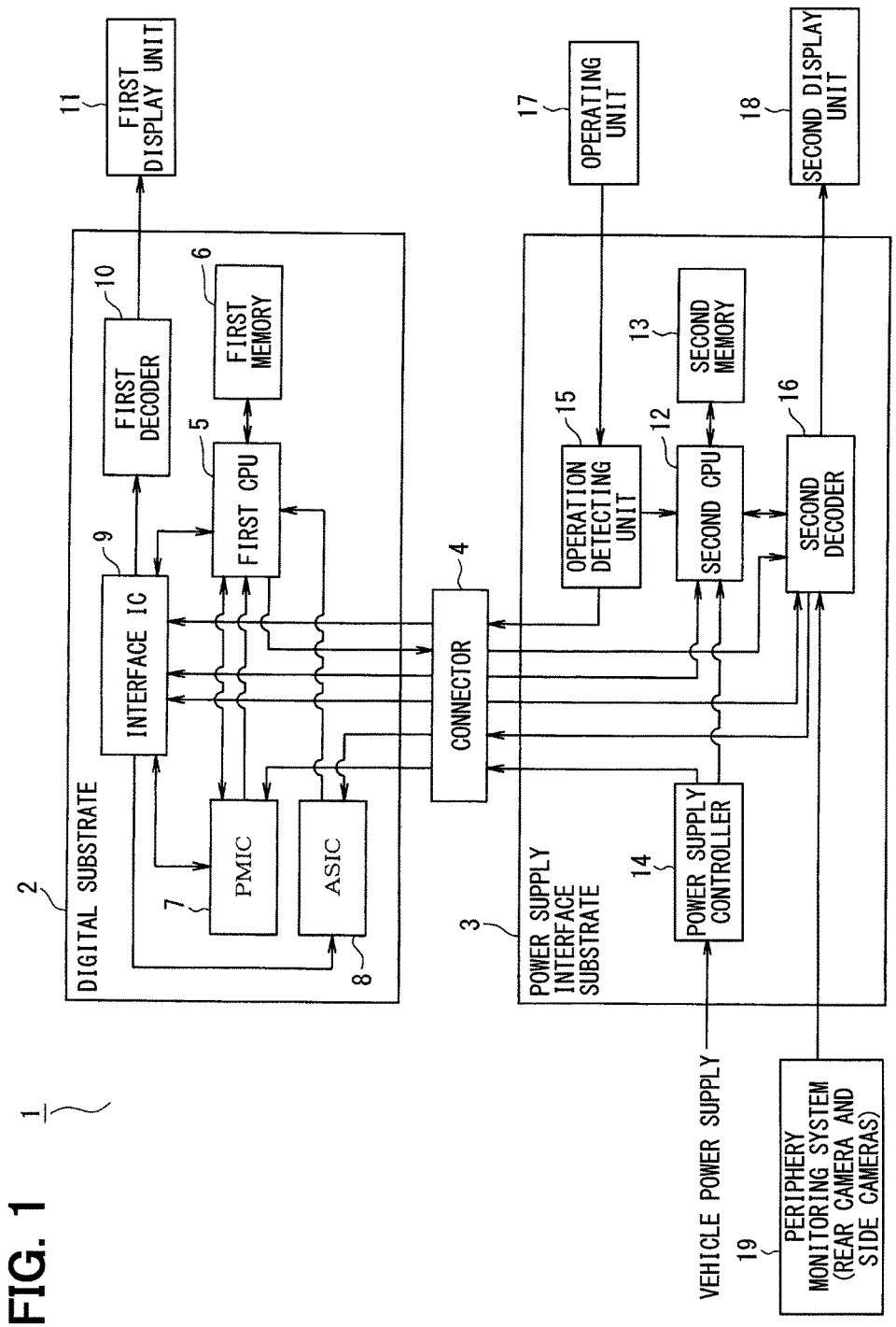
FIG. 1 is a functional block diagram showing a first embodiment of the present disclosure.

The following describes a first embodiment of the present disclosure applied to a vehicular data processing device mounted to a vehicle with reference to FIGS. 1 to 7. A vehicular data processing device 1 can be mounted to a vehicle and includes a digital substrate 2 (corresponding to a first substrate) and a power supply interface substrate 3 (corresponding to a second substrate). When it says that the data processing device can be mounted to a vehicle, it means that the data processing device may be mounted to the vehicle in a stationary state or the data processing device is attachable to or detachable from the vehicle. The digital substrate 2 and power supply interface substrate 3 are connected to each other via a connector 4 so that they can be disconnected from each other. When the digital substrate 2 and power supply interface substrate 3 are connected to each other via the connector 4, data can be transferred between the substrates. The digital substrate 2 can be replaced with another with respect to the power supply interface 3

The digital substrate 2 includes a first central processing unit (CPU) 5 (corresponding to a first controller), a first memory 6, a power management integrated circuit (PMIC) 7 (corresponding to a power supply management device), an application-specific integrated circuit (ASIC) 8, an interface IC 9 (corresponding to a monitoring device), and a first decoder 10. Between the first CPU 5 and interface IC 9, a line (i.e., state monitoring line) over which the state of the first CPU 5 is monitored is laid. Between the PMIC 7 and interface IC 9, a line (i.e., state monitoring line) over which the state of the PMIC 7 is monitored is laid. The state monitoring lines are connected to an interrupt port of a second CPU 12 on the power supply interface substrate 3, which will be described later, via the connector 4. Specifically, the second CPU 12 on the power supply interface substrate 3 monitors input and output (i.e., transfer) of data between the first CPU 5 and PMIC 7 via the interface IC 9 over the state monitoring lines, and thus monitors the states of the first CPU 5 and PMIC 7 respectively.

The first memory 6 stores an operation program which can be run by the first CPU 5. The first CPU 5 reads and runs the operation program stored in the first memory 6, and manages the overall operation of the digital substrate 2. The first CPU 5 can run a program of a distributed application, which is downloaded from a server over a network, or a program of an application which is transferred from a recording medium such as a universal serial bus (USB) memory or the like. By running the program, the first CPU 5 processes a large amount of digital data, for example, image data or music data.

The PMIC 7 feeds power, which is fed from a power supply controller 14 on the power supply interface substrate 3, which will be described later, via the connector 4, as operating power to the first CPU 5, and manages the operating power of the first CPU 5. More particularly, the PMIC 7 regularly inputs a state notification command, which represents the state of the first CPU 5, from the first CPU 5, discriminates the state of the first CPU 5, and controls the operating power, which is fed to the first CPU 5, according to the state of the first CPU 5. In other words, if the PMIC 7 decides that the first CPU 5 is in a low-load state (idle or the like), the PMIC 7 lowers the operating power to be fed to the first CPU 5, and thus gives priority to power saving. If the PMIC 7 decides that the first CPU 5 is in a high-load state, the PMIC 7 increases the operating power to be fed to the first CPU 5, and thus gives priority to a processing rate.

The PMIC 7 regularly outputs a query command, with which whether operating power fed to the first CPU 5 is normal is queried, to the first CPU 5. After the first CPU 5 inputs the query command from the PMIC 7, if the first CPU 5 decides that the operating power fed from the PMIC 7 is normal, the first CPU 5 outputs a response command, which signifies that the operating power is normal, to the PMIC 7. By inputting the response command, which signifies that the operating power is normal, from the first CPU 5, the PMIC 7 decides that the operating power of the first CPU 5 is normal. In contrast, if the first CPU 5 decides that the operating power fed from the PMIC 7 is not normal (in other words, abnormal), the first CPU 5 outputs a response command, which signifies that the operating power is not normal, to the PMIC 7. By inputting the response command, which signifies that the operating power is not normal, from the first CPU 5, or by not inputting the response command, which signifies that the operating power is normal, within a predetermined period since the time when the query command is outputted, the PMIC 7 decides that the operating power of the first CPU 5 is not normal.

When the PMIC 7 inputs a reset signal from the second CPU 12 on the power supply interface substrate 3 which will be described later, the PMIC 7 selects whether to reset the first CPU 5 alone (as a part of the digital substrate 2) or reset the PMIC 7 itself and first CPU 5 (as the whole of the digital substrate 2) according to the type of inputted reset signal. More particularly, when the PMIC 7 inputs a first reset signal, the PMIC 7 outputs a reset command to the first CPU 5, resets the first CPU 5, but does not reset itself. In contrast, when the PMIC 7 inputs a second reset signal, the PMIC 7 resets the PMIC 7 itself, and discontinues a feed of the operating power to the first CPU 5. Thus, the PMIC 7 resets the first CPU 5 along with resetting of itself. When the PMIC 7 inputs an operation restriction signal from the second CPU 12, the PMIC 7 outputs an operation restriction command to the first CPU 5 and restricts the operation (such as diminishing a load) of the first CPU 5.

The interface IC 9 monitors a command, which is outputted from the first CPU 5 to the PMIC 7, or a command, which is outputted from the PMIC 7 to the first CPU 5, over the state monitoring lines. After the first decoder 10 inputs data from the first CPU 5 via the interface IC 9, the first decoder 10 decodes the inputted data so as to produce rendering data, and outputs the produced rendering data to a first display unit 11. The first display unit 11 is formed with, for example, a liquid crystal display. The first display unit 11 inputs the rendering data from the first decoder 10, and displays an image represented by the received rendering data.

The power supply interface substrate 3 includes the second CPU 12 (corresponding to a second controller), a second memory 13, the power supply controller 14, an operation detecting unit 15, and a second decoder 16 (corresponding to a data processor).

The second memory 13 stores an operation program which the second CPU 13 can run. The second CPU 12 reads and runs the operation program stored in the second memory 13, and manages the overall operation of the power supply interface substrate 3. The second CPU 12 inputs a command, which is outputted from the first CPU 5 to the PMIC 7, or a command, which is outputted from the PMIC 7 to the first CPU 5, from the interface IC 9 via the connector 4, and monitors the operation of the digital substrate 2. The second CPU 12 outputs the first reset signal or second reset signal to the PMIC 7, and controls resetting of the digital substrate 2. The second CPU 12 outputs an operation restriction signal to the PMIC 7, and restricts the operation of the digital substrate 2.

The power supply controller 14 converts power, which is fed from a vehicle power supply (i.e., vehicle battery) mounted to a vehicle, into a predetermined voltage value, feeds the power as operating power to the second CPU 12, and also feeds the power as operating power to the PMIC 7 via the connector 4. When a user operates an operating unit 17, the operation detecting unit 15 inputs an operation detecting signal from the operating unit 17. The operation detecting unit 15 then outputs the inputted operation detecting signal to the second CPU 12, and also outputs the operation detecting signal to the interface IC 9 via the connector 4. The operating unit 17 includes touch buttons or the like displayed on a second display unit 18 formed with, for example, a liquid crystal display.

A periphery monitoring system 19 includes a rear camera that images a backward area of a vehicle and side cameras that images lateral areas of the vehicle, outputs a picture, which is produced by any of the rear camera and side cameras, in the form of a video signal conformable to the standard specified by the National Television Standards Committee (NTSC). The second decoder 16 inputs the video signal from any of the rear camera and side cameras of the periphery monitoring system 19, and then switches transmission paths for video data, which is contained in the inputted video signal, in response to a switching command inputted from the second CPU 12. Specifically, after the second decoder 16 inputs a first switching command from the second CPU 12, the second decoder 16 decodes the video data, which is contained in the video signal inputted from the periphery monitoring system 19, so as to produce a digital RGB signal, and outputs the produced digital RGB signal to the second display unit 18 (that is, first processing mode in which a result of processing of data is outputted without collaboration with the first CPU 5). The second display unit 18 renders a picture represented by the digital RGB signal inputted from the second decoder 16.

The second decoder 16 inputs a second switching command from the second CPU 12, and in turn outputs video data, which is contained in the video signal inputted from the periphery monitoring system 19, to the ASIC 8 via the connector 4. The ASIC 8 performs predetermined data conversion processing on the video data inputted from the second decoder 16 via the connector 4, and outputs the data to the first CPU 5. The first CPU 5 performs various manipulations on the video data inputted from the ASIC 8 so as to produce a digital RGB signal, and outputs the produced digital RGB signal to the second decoder 16 via the connector 4. The second decoder 16 decodes the video data, which is contained in the video signal inputted from the periphery monitoring system 19, so as to produce a digital RGB signal, synthesizes the produced digital RGB signal with the digital RGB signal inputted from the first CPU 5 via the connector 4, and outputs the synthetic digital RGB signal to the second display unit 18 (that is, second processing mode in which a result of processing of data is outputted in collaboration with the first CPU 5). The second display unit 18 renders a picture represented by the digital RGB signal inputted from the second decoder 16.

Figure 2:
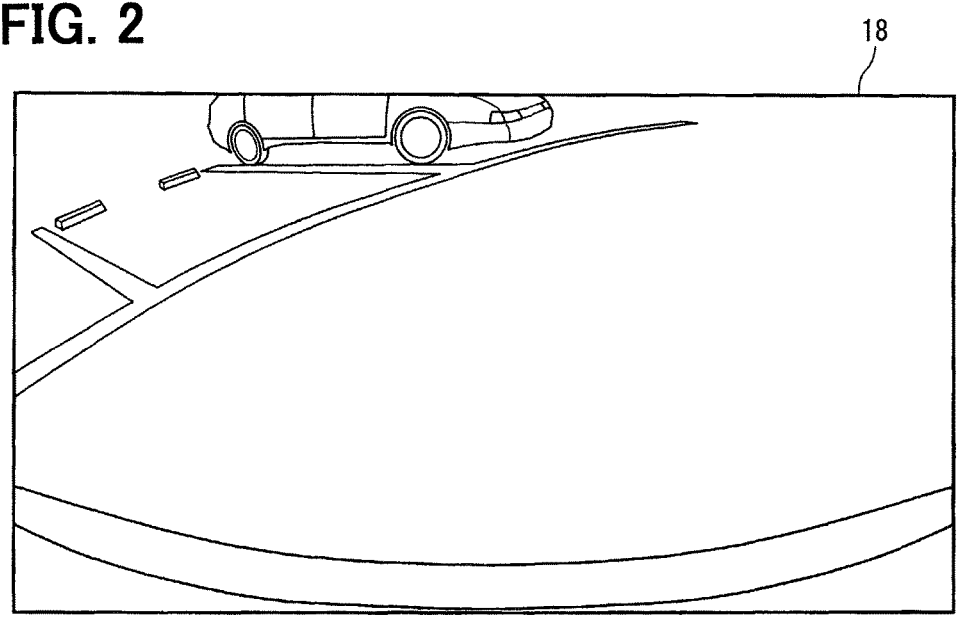
FIG. 2 is a diagram showing an example of a display screen image to be displayed on a second display unit.

The second CPU 12 selectively outputs either the first switching command or second switching command to the second decoder 16, and selectively switches a mode in which the second CPU 12 has the initiative in rendering, and a mode in which the second CPU 12 passes the initiative to the first CPU 5 and the first CPU 5 has the initiative. When the second CPU 12 has the initiative in rendering, video data contained in a video signal inputted from the periphery monitoring system 19 is not transmitted to the first CPU 5. Therefore, the second display unit 18 displays, as shown in FIG. 2, a picture represented by the video data contained in the video signal inputted from the periphery monitoring system 19 (i.e., a raw picture that is not manipulated).

Figure 3:
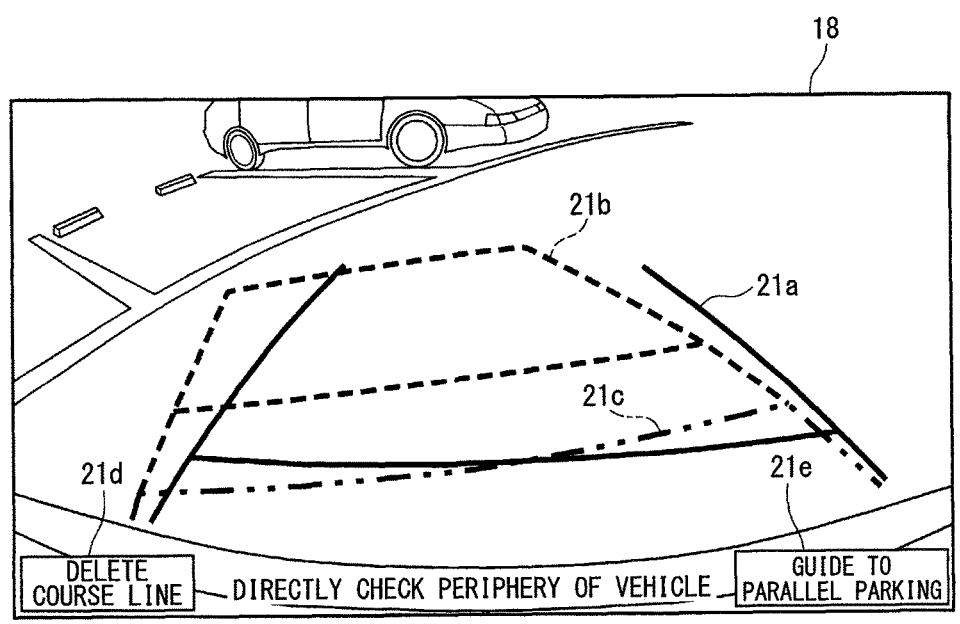
FIG. 3 is a diagram showing another example of the display screen image to be displayed on the second display unit.
Figure 4:
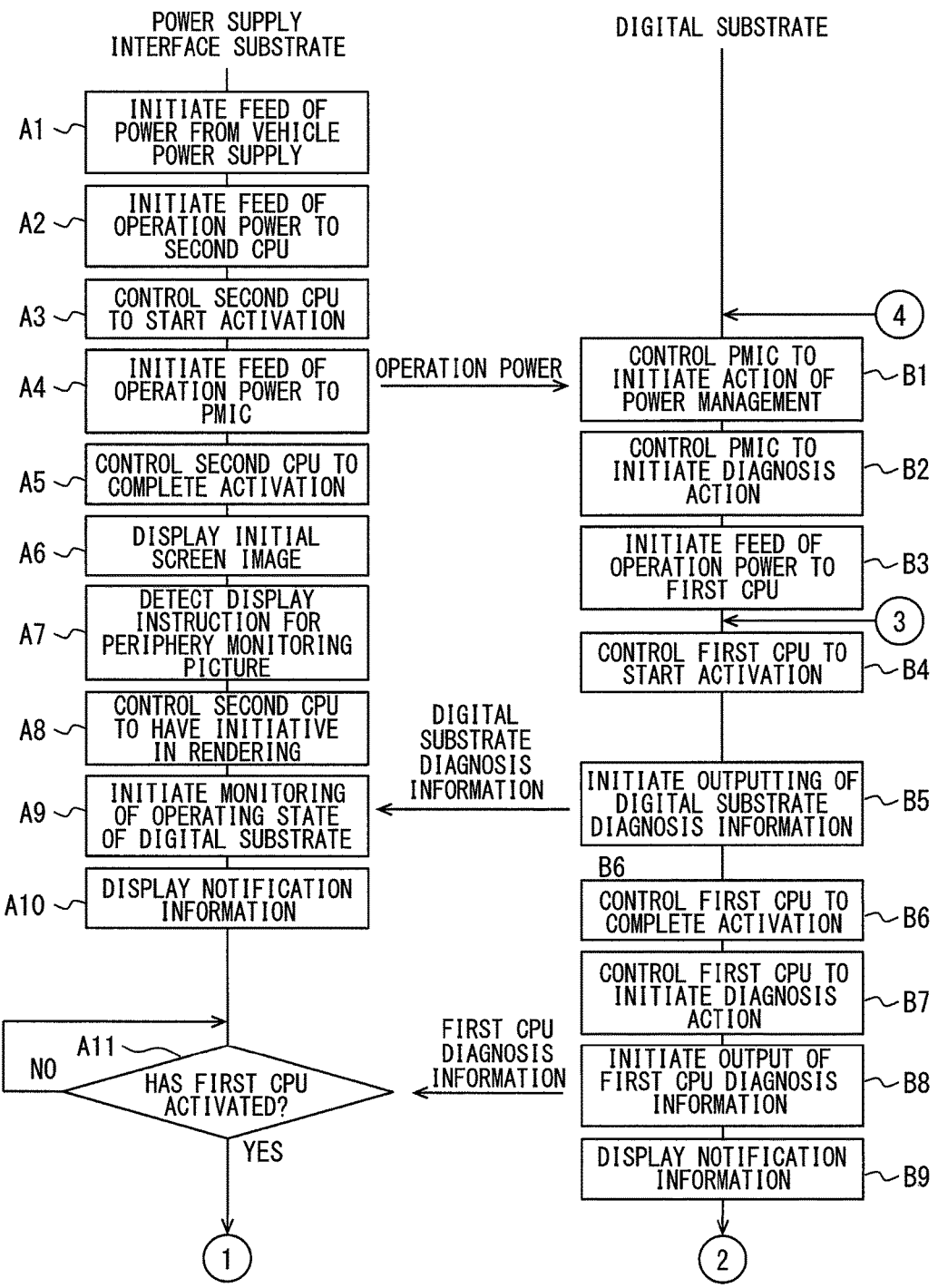
FIG. 4 is a flowchart describing a sequence relating to the first embodiment.
Figure 5:
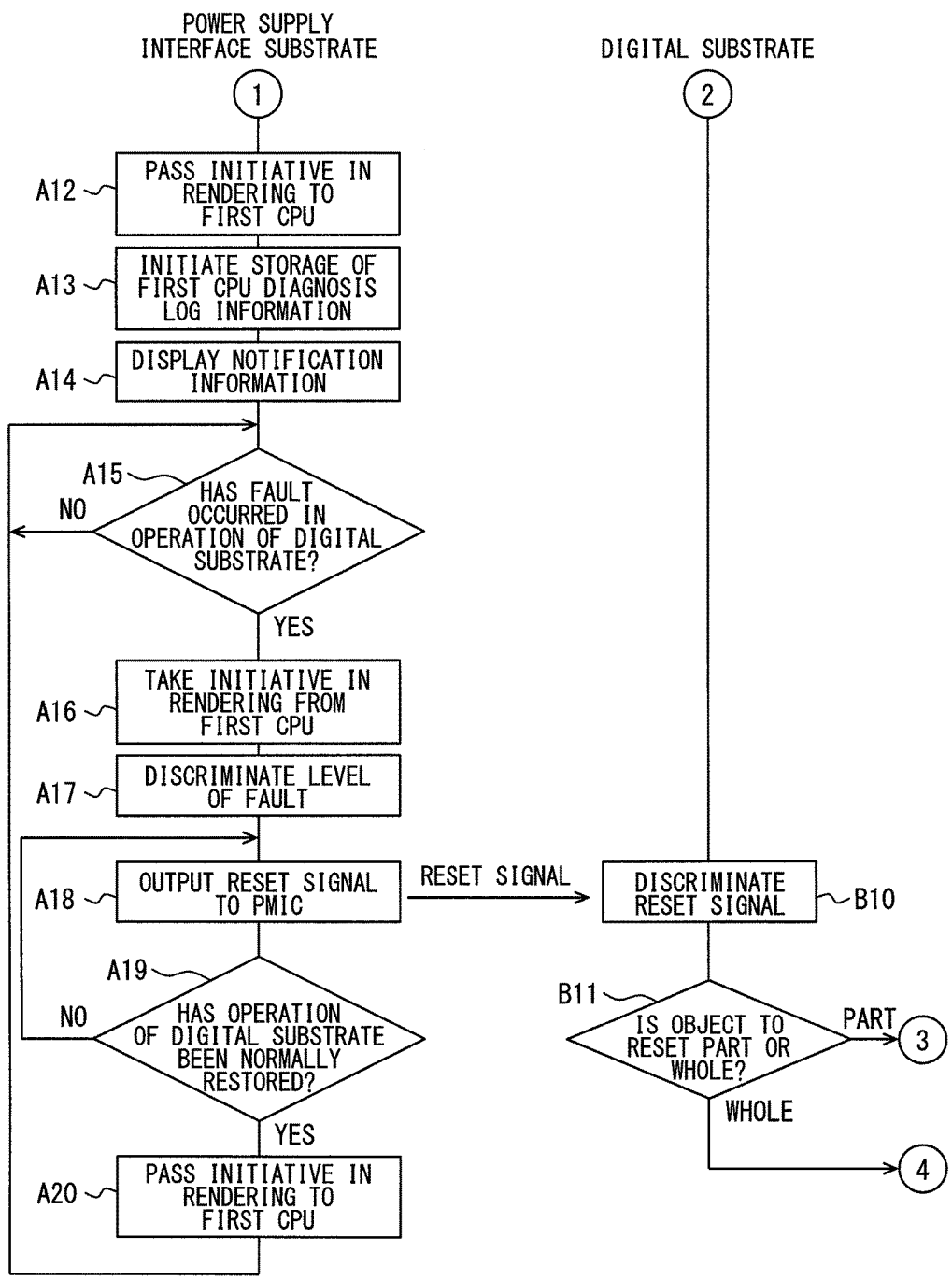
FIG. 5 is a flowchart subsequent to the flowchart of FIG. 4.

When the second CPU 12 passes the initiative in rendering to the first CPU 5 and the first CPU 5 has the initiative in rendering, video data contained in a video signal inputted from the periphery monitoring system 19 is transmitted to the first CPU 5. Therefore, the second display unit 18 displays a picture (i.e., manipulated picture) that has, as shown in FIG. 3, guiding lines and human-machine interfaces (HMIs) (as additional data) appended to the video data contained in the video signal inputted from the periphery monitoring system 19. In FIG. 3, as the guiding lines, a vehicle width extension 21a (illustrated by the solid line) that is a line drawn by extending a vehicle width, a course prediction line 21b (illustrated by the dashed line) that is a line drawn by predicting a course based on a current steering angle, and a distance estimation line 21c (illustrated by the alternate long and two short dashes line) that indicates a distance of, for example, approximately 0.5 m from a vehicle body are shown. The second display unit 18 displays the vehicle width extension 21a in green, the course prediction line 21b in yellow, and the distance estimation line 21c in red, and thus displays the guiding lines in colors. In FIG. 3, as the HMIs, a Delete Course Line button 21d and Guide to Parallel Parking button 21e which can be operated by a user are shown.

The vehicular data processing device 1 configured as described above switches the on and off states of the power supply along with turning on or off of the ACC switch. Specifically, when the state of the ACC switch is changed from the on state to the off state, a feed of power from the vehicle power supply to the power supply controller 14 is initiated and the power supply is turned on. When the state of the ACC switch is changed from the off state to the on state, the feed of power from the vehicle power supply to the power supply controller 14 is ceased and the power supply is turned off.

In the foregoing configuration, the second CPU 12 is configured to operate using a program whose storage capacity is relatively small and which is referred to as the so-called real-time operating system (OS). Therefore, the time which the second CPU 12 takes to read the OS or program is relatively short. In contrast, the first CPU 5 is configured to operate using a program whose storage capacity is relatively larger than the capacity of the program, which is used by the second CPU 12, in terms of the nature of processing a large amount of digital data. Accordingly, the time which the first CPU 5 takes to read an OS or program is relatively long. When an activation time (i.e., first activation time) to be taken from the moment when operating power is fed to the first CPU 5 and the first CPU begins activation to the moment when the first CPU 5 completes activation (i.e., the first CPU 5 becomes able to run a program) is compared with a activation time (i.e., second activation time) to be taken from the moment when the operating power is fed to the second CPU 12 and the second CPU 12 begins activation to the moment when the second CPU 12 completes activation, the former one is longer than the latter one. Accordingly, a period during which the second CPU 12 has completed activation but the first CPU 5 has not completed activation occurs. The first CPU 5 specializes in processing of information data, for example, image data or music data. In contrast, the second CPU 12 specializes in processing of vehicular data relating to vehicle control.

As mentioned above, in the configuration in which the first CPU 5 processes a large amount of data, an application to be implemented with a large amount of data may need a resource (i.e., storage capacity, computing speed, or the like) exceeding the throughput of the first CPU 5. As a result, processing being performed by the first CPU 5 may be delayed or ceased. There is a possibility that a fault may occur in the operation of the digital substrate 2. When the first CPU 5 processes a program of a distributed application that is downloaded from a server over a network or a program of an application transferred from a recording medium such as a USB memory, since an amount or structure of data is determined irrespective of the throughput of the first CPU 5, there is a high possibility that a fault may occur in the operation of the digital substrate 2. Namely, the first CPU 5 is poorer in operating stability in comparison with the second CPU 12.

In the present embodiment, in consideration of a point that an activation time of the first CPU 5 is longer than a activation time of the second CPU 12 and a point that there is a possibility that a fault may occur in the operation of the digital substrate 2 after the first CPU 5 has completed activation, a mode in which the second CPU 12 has the initiative in rendering and a mode in which the first CPU 5 has the initiative are, as described later, selectively switched. In this case, since the second CPU 12 completes activation earlier than the first CPU 5 does, the second CPU 12 exhibits excellent operating stability, and the second CPU 12 can monitor the operation of the digital substrate 2 via the interface IC 9, the second CPU 12 is in charge of switching the initiative in rendering between the first and second CPUs.

Next, the following describes an effect of the above-mentioned configuration with reference to FIGS. 4 to 7.

When a user (i.e., driver) turns off the ACC switch that has been on, a feed of power from the vehicle power supply to the power supply controller 14 is initiated on the power supply interface substrate 3 (at step A1). When a feed of power from the vehicle power supply is initiated, the power supply controller 14 initiates a feed of operating power to the second CPU 12 (at step A2). When a feed of the operating power from the power supply controller 14 is initiated, the second CPU 12 begins activation and reads an OS and program (at step A3). The power supply controller 14 initiates a feed of the operating power to the PMIC 7 on the digital substrate 2 (at step A4). After the second CPU 12 has begun activation, if the second CPU 12 normally reads the OS and program, the second CPU 12 completes activation (at step A5). When the second CPU 12 completes activation, the second CPU 12 displays an initial screen image (i.e., activation screen image) on the second display unit 18 so that an operation performed by a user on the operating unit 17 can be accepted (at step A6).

After the second CPU 12 has thus completed activation, when the second CPU 12 senses that a user has entered a display instruction for a periphery monitoring picture (for example, a user has moved a shift lever to, for example, a reverse position (at step A7), the second CPU 12 outputs a first switching command to the second decoder 16 so as to take the initiative in rendering (at step A8). At this time, the second display unit 18 displays a picture (i.e., raw picture that is not manipulated) represented by video data contained in a video signal inputted from the periphery monitoring system 19. Namely, the user can discern a raw picture produced by any of the rear camera and side cameras of the periphery monitoring system 19.

On the digital substrate 2, when a feed of operating power from the power supply controller 14 on the power supply interface substrate 3 is initiated, the PMIC 7 initiates an action of power management (at step B1), and initiates a self-diagnosis action (at step B2). The PMIC 7 initiates a feed of the operating power to the first CPU 5 (at step B3). When a feed of the operating power from the PMIC 7 is initiated, the first CPU 5 begins activation, performs hardware check, and thereafter reads an OS and program (at step B4). The interface IC 9 begins monitoring input and output (i.e., transfer) of data between the first CPU 5 and PMIC 7 over the state monitoring lines, and begins outputting digital substrate diagnosis information, which represents a result of monitoring, to the second CPU 12 (at step B5).

After the first CPU 5 has begun activation, when the first CPU 5 normally terminates hardware check and normally reads the OS and program, the first CPU 5 completes activation (at step B6). After the first CPU 5 has completed activation, the first CPU 5 initiates a self-diagnosis action (at step B7). The interface IC 9 begins outputting first CPU diagnosis information, which represents a result of diagnosis, to the second CPU 12 (at step B8). After the first CPU 5 has completed activation, the first CPU 5 displays notification information, which signifies that the first CPU 5 has completed activation, on the first display unit 11 (at step B9). Namely, by checking the notification information, a user can grasp that the first CPU 5 has completed activation. The first CPU 5 may not display the notification information on the first display unit 11.

On the power supply interface substrate 3, when input of digital substrate diagnosis information from the interface IC 9 is initiated, the second CPU 12 analyzes the inputted digital substrate diagnosis information, begins monitoring the operating state of the digital substrate 2, and begins monitoring the states of the PMIC 7 and first CPU 5 (at step A9). Specifically, during a period during which the first CPU 5 performs hardware check and reads an OS and program, the second CPU 12 monitors the states of the PMIC 7 and first CPU 5 respectively. After the second CPU 12 has begun monitoring the operating state of the digital substrate 2, the second CPU 12 displays notification information, which signifies that the second CPU has begun monitoring the operating state of the digital substrate 2, on the second display unit 18 (at step A10). Namely, by checking the notification information, a user can grasp that monitoring the operating state of the digital substrate 2 has been begun. The second CPU 12 may not display the notification information on the second display unit 18. While the second CPU 12 is monitoring the operating state of the digital substrate 2, the second CPU 12 decides whether the first CPU 5 has started (at step A11).

When input of first CPU diagnosis information from the first CPU 5 is initiated, the second CPU 12 decides that the first CPU 5 has completed activation (step A11: Yes), outputs a second switching command to the second decoder 16, and passes the initiative in rendering to the first CPU 5 (at step A12). At this time, the second display unit 18 displays, as shown in FIG. 3, a picture having guiding lines and HMIs appended to video data contained in a video signal inputted from the periphery monitoring system 19. Namely, a user can discern a picture having guiding lines (i.e., vehicle width extension 21a, course prediction line 21b, and distance estimation line 21c) and HMIs (i.e., Delete Course Line button 21d and Guide to Parallel Parking button 21e) appended to a raw picture produced by any of the rear camera and side cameras of the periphery monitoring system 19.

Thereafter, the second CPU 12 analyzes first CPU diagnosis information inputted from the first CPU 5, and begins storing diagnosis log information on the first CPU 5 in the first memory 6 (at step A13). After the second CPU 12 begins storing the diagnosis log information on the first CPU 5, the second CPU 12 displays on the second display unit 18 notification information signifying that the CPU 12 has begun storing the diagnosis log information on the first CPU 5 (at step A14). By checking the notification information, a user can grasp that storing the diagnosis log information on the first CPU 5 has been begun. The second CPU 12 may not display the notification information on the second display unit 18. While the second CPU 12 is storing the diagnosis log information on the first CPU 5, the second CPU 12 decides whether a fault has occurred in the operation of the digital substrate 2 (at step A15).

The second CPU 12 monitors the state of a command (type of command, input/output timing, etc.), which is inputted or outputted between the PMIC 7 and first CPU 5, on the basis of digital substrate diagnosis information inputted from the interface IC 9, and verifies the state of the command with a normal state stored in advance. The second CPU 12 decides based on a result of collation whether a fault has occurred in the operation of the digital substrate 2. If the second CPU 12 decides that an fault has occurred (step A15: Yes), the second CPU 12 outputs a first switching command to the second decoder 16, and takes the initiative in rendering from the first CPU 5 (at step A16). At this time, the second display unit 18 re-displays a picture (i.e., raw picture that is not manipulated) represented by video data contained in a video signal inputted from the periphery monitoring system 19. Namely, a user can discern the raw picture, which is produced by any of the rear camera and side cameras of the periphery monitoring system 19, again.

Figure 6A:
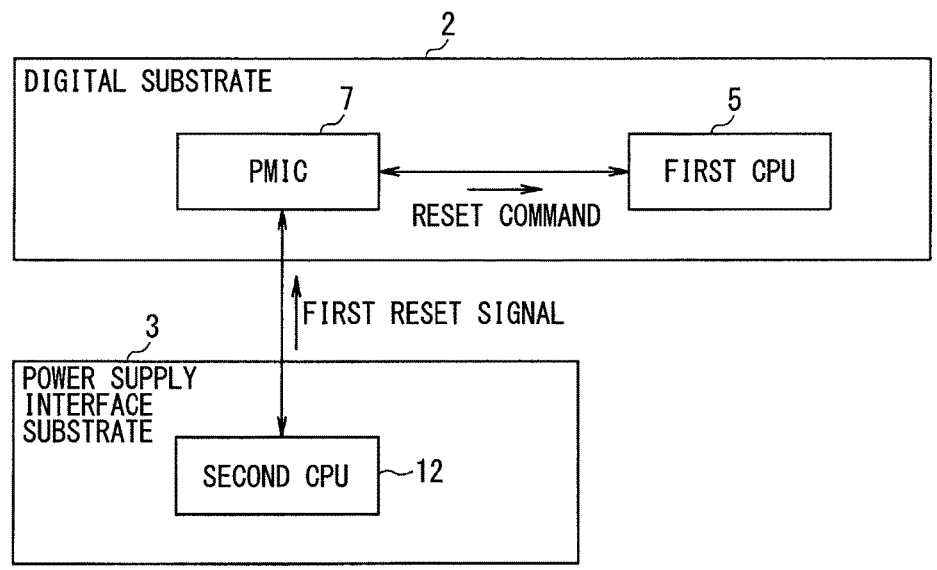
FIG. 6A is a diagram showing a mode in which a second CPU outputs a first reset signal.
Figure 6B:
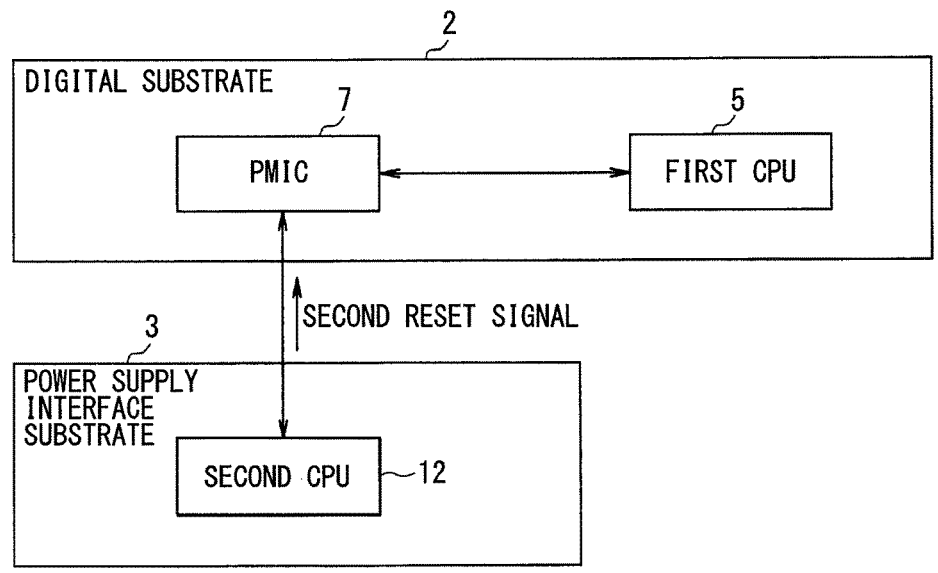
FIG. 6B is a diagram showing a mode in which the second CPU outputs a second reset signal.

The second CPU 12 discriminates the level of a fault that has occurred (at step A17). More particularly, for example, when a delay occurs in transfer of a specific command between the PMIC 7 and first CPU 5, the second CPU 12 decides based on the delay time whether either of the PMIC 7 and first CPU 5 need to be reset, and outputs a reset signal to the PMIC 7 (at step A18). For example, when the delay time exceeds a first predetermined time but does not exceed a second predetermined time longer than the first predetermined time, the second CPU 12 decides that the PMIC 7 need not be reset but the first CPU 5 need be reset. In this case, the second CPU 12 outputs, as shown in FIG. 6A, a first reset signal to the PMIC 7. For example, when the delay time exceeds the second predetermined time, the second CPU 12 decides that both the PMIC 7 and first CPU 5 need to be reset. In this case, the second CPU 12 outputs, as shown in FIG. 6B, a second reset signal to the PMIC 7. As for a technique for discriminating the level of a fault, aside from the foregoing method of discriminating the delay time, deciding whether a sequence is normal (i.e., whether commands are transferred in specified order) will do.

After the second CPU 12 has outputted either the first reset signal or second reset signal, the second CPU 12 analyzes digital substrate diagnosis information inputted from the interface IC 9 so as to decide whether the operation of the digital substrate 2 has been normally restored (at step A19). If the second CPU 12 decides that the operation of the digital substrate 2 has been normally restored (a fault is resolved) (step A19: Yes), the second CPU 12 outputs a second switching command to the second decoder 16, passes the initiative in rendering to the first CPU 5 (at step A20), and ceases output of either the first reset signal or second reset signal. At this time, the second display unit 18 again displays, as shown in FIG. 3, a picture having guiding lines and HMIs appended to video data contained in a video signal inputted from the periphery monitoring system 19. Back at step A15, the second CPU 12 continuously decides whether a fault has occurred in the operation of the digital substrate 2.

In contrast, when the second CPU 12 decides that the operation of the digital substrate 2 has not been normally restored (i.e., an fault has not been resolved) (step A19: No), back at step A18, the second CPU 12 continuously outputs either the first reset signal or second reset signal until the second CPU 12 decides that a fault has been resolved. At this time, the second CPU 12 outputs either the first reset signal or second reset signal irrespective of input of a operation detecting signal from the operation detecting unit 15 or output of rendering data to the second decoder 16. Namely, even during a period during which either the first reset signal or second reset signal is being outputted, an operation performed by a user on the operating unit 17 can be accepted or a picture can be displayed on the display unit 18. In other words, since the digital substrate 2 is separated from the power supply interface substrate 3 that accepts an operation performed by a user on the operating unit 17, the digital substrate 2 can be reset separately from the operation of the power supply interface substrate 3.

On the digital substrate 2, the PMIC 7 decides whether a reset signal inputted from the second CPU 12 is the first reset signal or second reset signal (at step B10), and decides whether a resetting object is the first CPU 5 alone (as a part of the digital substrate 2) or both the PMIC 7 and first CPU 5 (as the whole of the digital substrate 2) (at step B11).

If the PMIC 7 decides that the reset signal inputted from the second CPU 12 is the first reset signal, the PMIC 7 outputs a reset command to the first CPU 5 and resets the first CPU 5 but does not reset the PMIC 7 itself. Specifically, the processing sequence returns to a step immediately succeeding a step at which a feed of operating power from the PMIC 7 to the first CPU 5 is initiated. The first CPU 5 again reads an OS and program after beginning activation and performing hardware check (at step B4), and steps subsequent to step B4 are executed again. If the PMIC 7 decides that the reset signal inputted from the second CPU 12 is the second reset signal, the PMIC 7 resets the PMIC 7 itself. When the PMIC 7 resets the PMIC 7 itself, a feed of the operating power to the first CPU 5 is discontinued. Therefore, along with resetting the PMIC 7 itself, the PMIC 7 resets the first CPU 5. Specifically, the processing sequence returns to the step immediately subsequent to the step at which a feed of the operating power from the power supply controller 14 on the power supply interface substrate 3 to the PMIC 7 is initiated, the PMIC 7 resumes a power management action (at step B1), and steps subsequent to step B1 are executed again.

Figure 7:
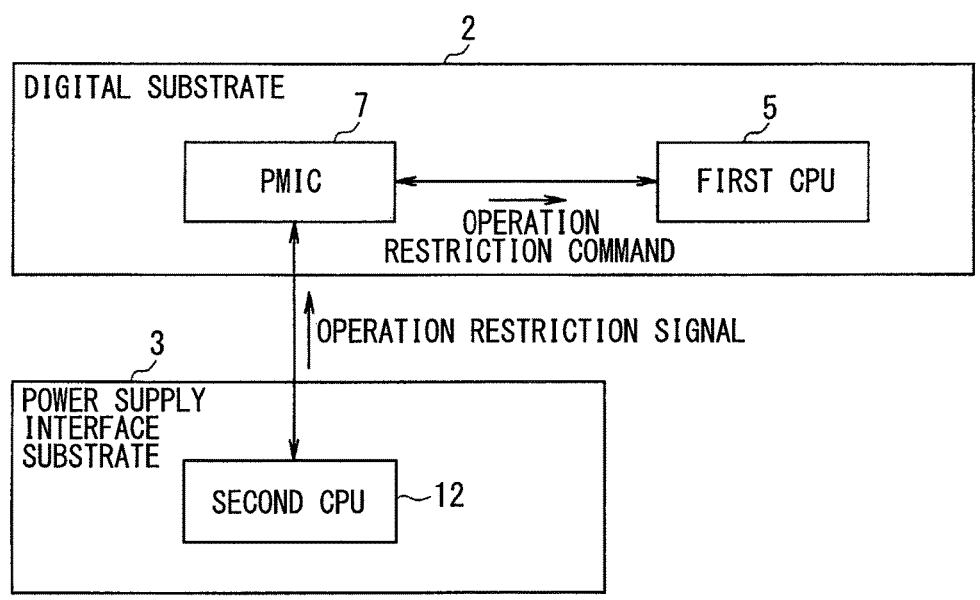
FIG. 7 is a diagram showing a mode in which the second CPU outputs an operation restriction signal.

By analyzing digital substrate diagnosis information and first CPU diagnosis information which are inputted from the interface IC 9, the second CPU 12 decides that the first CPU 5 is a high-load state. When the second CPU 12 decides that the operation of the first CPU 5 has to be restricted, the second CPU 12 outputs, as shown in FIG. 7, an operation restriction signal to the PMIC 7 so as to restrict the operation (that is, decreases the load) of the first CPU 5.

By performing the foregoing processing sequence, immediately after a user is turned on the ACC switch that has been off, as long as the second CPU 12 on the power supply interface substrate 3 has completed activation, even if the first CPU 5 on the digital substrate 2 has not completed activation, since the second CPU 1 has the initiative in rendering, a raw picture produced by any of the rear camera and side cameras of the periphery monitoring system 19 is displayed. When the first CPU 5 completes activation, the second CPU 12 passes the initiative in rendering to the first CPU 5, and a picture having guiding lines and HMIs appended to the raw picture is displayed. Specifically, compared with a configuration that does not present any picture at all until the first CPU 5 completes activation, since the configuration of the present embodiment displays a raw picture, the configuration of the present embodiment can be said to be high-value-added. If a fault occurs in the operation of the digital substrate 2, the second CPU 12 takes the initiative in rendering from the first CPU 5, and a raw picture produced by any of the rear camera and side cameras of the periphery monitoring system 19 is displayed. When the operation of the digital substrate 2 is restored normally, the second CPU 12 passes the initiative in rendering to the first CPU 5, and a picture having guiding lines and HMIs appended to the raw picture is displayed. In other words, compared with the configuration that does not present any picture at all in a case where a fault occurs in the operation of the digital substrate 2, since the configuration of the present embodiment displays a raw picture, the configuration of the present embodiment can be said to be high-value-added. Similarly to the configuration of the present embodiment, according to the configuration that displays a picture of a backward or lateral area of a vehicle which a user cannot directly view, even immediately after a user turns on the ACC switch that has been off or in a case where an fault occurs in the operation of the digital substrate 2, since a raw picture is displayed, safety can be upgraded.

As described so far, according to the first embodiment, when the vehicular data processing device 1 is configured to include the first CPU 5 and second CPU 12 that are different from each other in a activation time to be taken from the moment activation is begun to the moment activation is completed, immediately after a user turns on the ACC switch that has been off, as long as the second CPU 12 has completed activation, even if the first CPU 5 has not completed activation, a raw picture produced by the periphery monitoring system 19 is displayed. Accordingly, immediately after the user turns on the ACC switch that has been off, although a picture having guiding lines and HMIs appended is not displayed, safety can be upgraded since a raw picture is displayed.

When the first CPU 5 completes activation, a picture having guiding lines and HMIs appended to a raw picture is displayed. Accordingly, since the picture having guiding lines and HMIs appended to the raw picture is displayed, safety can be reliably ensured. If a fault occurs in the operation of the digital substrate 2, the raw picture produced by the periphery monitoring system 19 is displayed. Accordingly, in case a fault occurs in the operation of the digital substrate 2, although the picture having the guiding lines and HMIs appended is not displayed, since the raw picture is displayed, safety can be upgraded. Further, when the operation of the digital substrate 2 is normally restored, the picture having the guiding lines and HMIs appended is displayed. Accordingly, by restoring a state attained before a fault occurs in the operation of the digital substrate 2, similarly to the state attained before the fault occurs in the operation of the digital substrate 2, safety can be reliably ensured.

Since the second CPU 12 whose operation is more stable in comparison with the operation of the first CPU 5 switches the initiative in rendering between the first and second CPUs, the initiative in rendering can be appropriately switched between the CPUs. A raw picture and a picture having guiding lines and HMIs appended can be appropriately switched and displayed. Whether the first CPU 5 alone is reset or both the PMIC 7 and first CPU 5 are reset is selected based on the level of a fault. Accordingly, the situation in which the PMIC 7 is reset regardless of the necessity of resetting PMIC 7 can be prevented, and the digital substrate 2 can be effectively reset. When a decision is made that the operation of the first CPU 5 is required to be restricted, the operation of the first CPU 5 is restricted. Therefore, the continuation of the first CPU 5 in a high-load state and the repetitive occurrence of a fault can be avoided. In addition, since the digital substrate 2 is attachable to or detachable from the power supply interface substrate 3, the digital substrate 2 can be properly replaced with a new one. Additional features added to the digital substrate 2 (i.e., upgrading the version of the digital substrate) can be flexibly applied without the necessity of modifying the configuration of a user interface.

Second Embodiment

Figure 8:
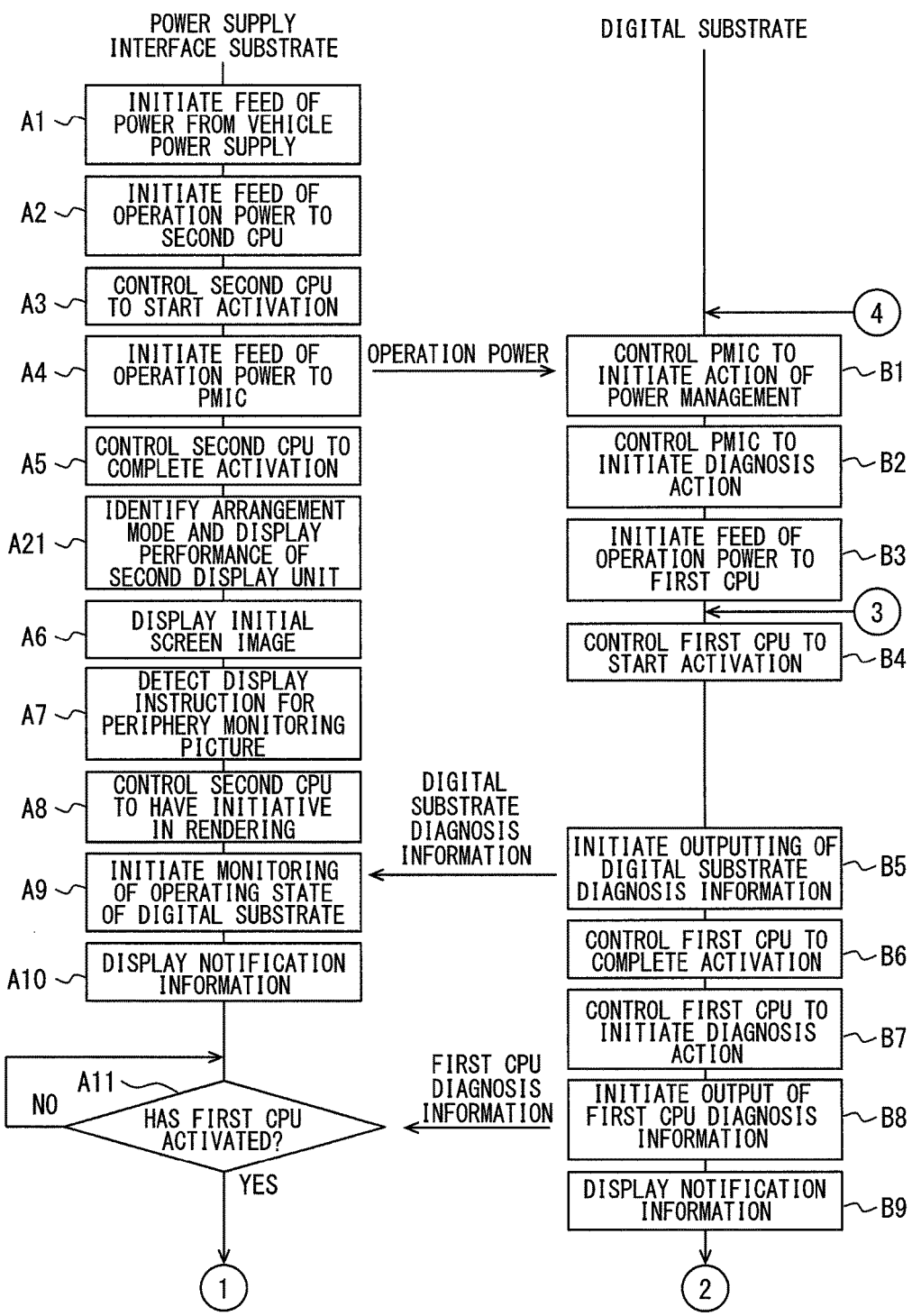
FIG. 8 is a flowchart describing a sequence relating to a second embodiment of the present disclosure.

Next, the following describes a second embodiment of the present disclosure with reference to FIGS. 8 to 10. The descriptions of the parts identical to the one in the first embodiment will be omitted, and only the parts different from the one in the first embodiment will be described. The second display unit 18 is available in a variety of arrangement modes (i.e., vertical placement or horizontal placement) or in a variety of display performances (i.e., the numbers of pixels in rows and columns (screen image resolution)). From this viewpoint, in the second embodiment, the second decoder 16 stores information on the arrangement mode and display performance of the second display unit 18, and decodes video data contained in a video signal inputted from the periphery monitoring system 19. The second decoder 16 then adjusts the decoded video data according to the arrangement mode and display performance of the second display unit 18, and produces a digital RGB signal.

More particularly, on the power supply interface substrate 3, the second CPU 12 begins activation, normally reads an OS and program, and then completes activation (at step A5). Thereafter, the second CPU 12 outputs information on the arrangement mode and display performance of the second display unit 18, which is stored in advance, to the second decoder 16. By inputting the information from the second CPU 12, the second decoder 16 identifies the information on the arrangement mode and display performance of the second display unit 18 (at step A21).

Figure 10A:
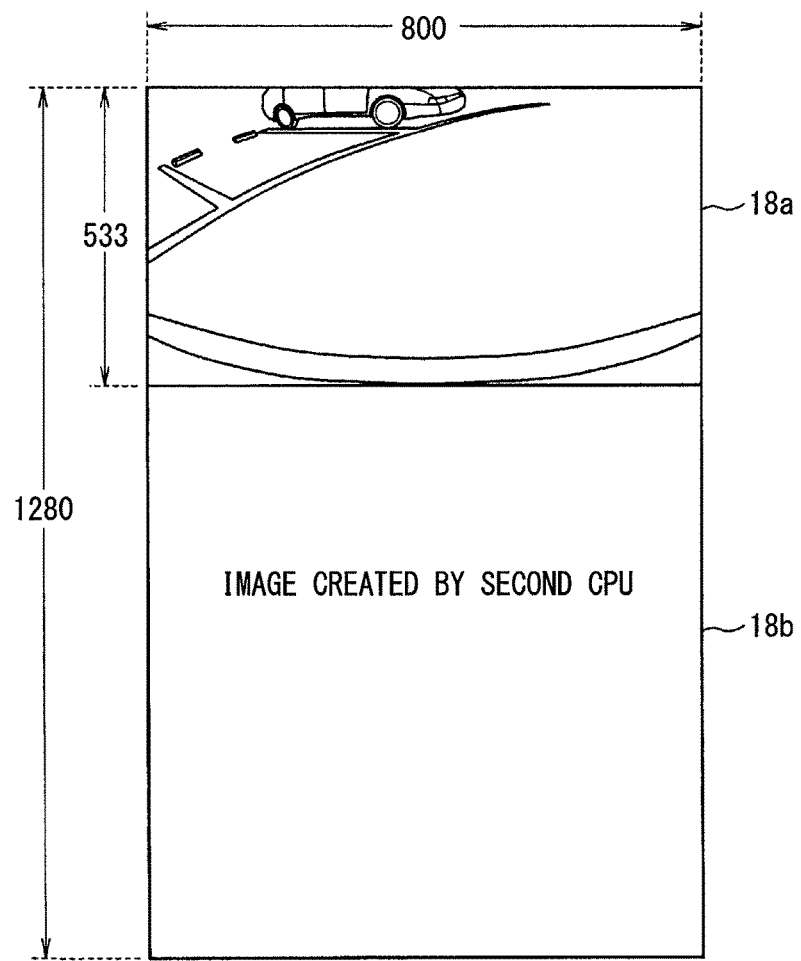
FIG. 10A is a diagram showing an example of a display screen image to be displayed on the second display unit.
Figure 10B:
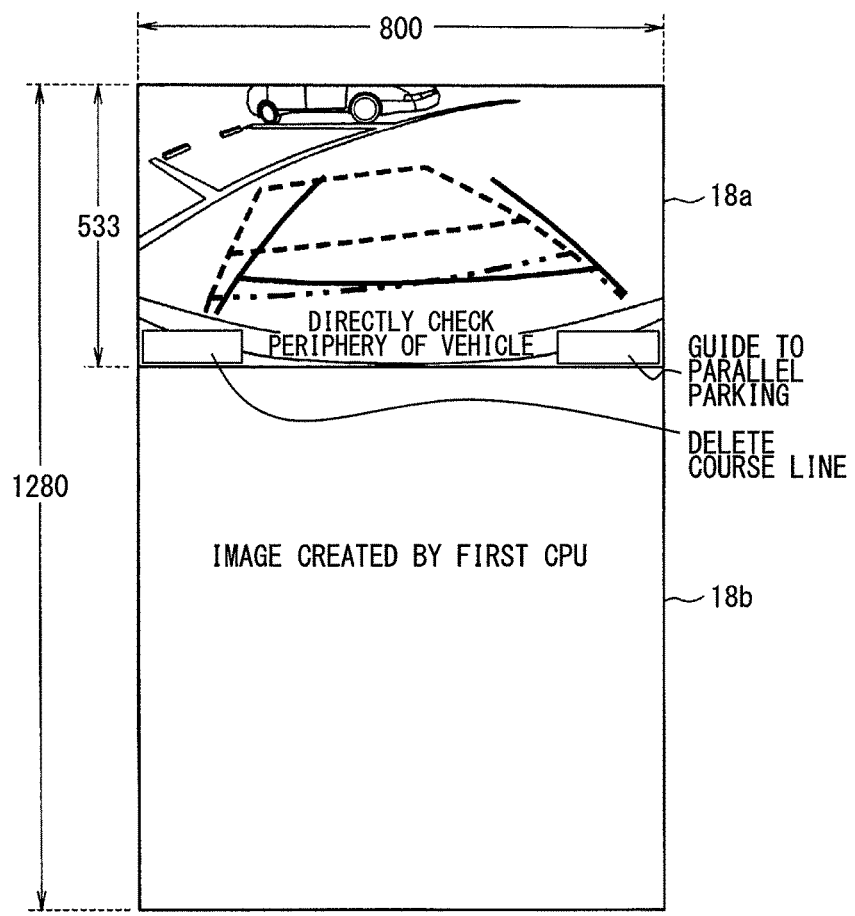
FIG. 10B is a diagram showing another example of the display screen image to be displayed on the second display unit.

When the second decoder 16 inputs a video signal conformable to the NTSC system from the periphery monitoring system 19, the second decoder 16 decodes video signal contained in the received video signal, adjusts the decoded video data according to the identified arrangement mode and display performance of the second display unit 18, and produces a digital RGB signal. Now, a description will be made of a case where when the second decoder 16 identifies, as shown in FIG. 9, FIG. 10A, and FIG. 10B, the arrangement mode of the second display unit 18 as lengthwise placement (i.e., placement with the longitudinal sides aligned in a vertical direction), the number of pixels in a horizontal direction as "800," and the number of pixels in a vertical direction as "1280," the second decoder 16 has decoded video data which has "720" pixels in the horizontal direction and "480" pixels in the vertical direction. In this case, since the decoded video data represents a horizontal long picture and the arrangement mode of the second display unit 18 is vertical placement, the second decoder 16 performs processing of turning the decoded video data by 90°.

Thereafter, since the numbers of pixels in the vertical and horizontal directions of video data are different from the numbers of pixels in the vertical and horizontal directions of the second display unit 18, the second decoder 16 calculates a magnification ratio. In this case, since the number of pixels in the horizontal direction of video data is "720" and the number of pixels in the horizontal direction of the second display unit 18 is "800," the second decoder 16 calculates the magnification ratio as "800/720." The second decoder 16 calculates the number of pixels in the vertical direction of the second display unit 18, which results from magnification, as "533" obtained by multiplying "480" by "800/720." The second decoder 16 changes the number of pixels in the horizontal direction of video data from "720" to "800," and the number of pixels in the vertical direction from "480" to "533," and thus performs processing of magnifying the video data. In this case, the second decoder 16 uses as a technique of magnifying video data an interpolation method to newly create pixels that do not exist in an original image represented by the video data. The second decoder 16 performs the processing of magnifying video data according to, for example, a nearest neighbor interpolation method that interpolates pixels, which do not exist in an original image, with the nearest pixels, or a linear interpolation or bicubic interpolation method that interpolates pixels with four surrounding pixels using a linear or cubic function.

The second decoder 16 produces a digital RGB signal from video data that has undergone processing of turning and magnifying, and outputs the produced digital RGB signal to the second display unit 18. The second display unit 18 inputs the digital RGB signal from the second decoder 16, and then renders a picture represented by the inputted digital RGB signal. The second display unit 18 renders, as shown in FIG. 10A and FIG. 10B, the picture, which is represented by the digital RGB signal inputted from the second decoder 16, in an upper display area 18a (i.e., a display area that is part of the second display unit). Since a lower display area 18b on the second display unit 18 (i.e., a display area that is another part of the second display unit) is unoccupied, in a period during which the second CPU 12 has the initiative in rendering, the second decoder 16 may display an image, which is created by the second CPU 12, in the lower display area 18b. The image to be created by the second CPU 12 is, for example, a still image. In a period during which the first CPU 5 has the initiative in rendering, the second decoder 16 may display the image, which is created by the first CPU 5, in the lower display area 18b. The image to be created by the first CPU 5 is, for example, an image making it possible to operate a Playback button or Stop button of an audio recorder, or a motion picture such as an animation.

As described so far, according to the second embodiment, in the vehicular data processing device 1, a picture produced by the periphery monitoring system 19 is adjusted according to the arrangement mode and display performance of the second display unit 18, and then displayed. Therefore, regardless of the arrangement mode and display performance of the second display unit 18, a picture produced by the periphery monitoring system 19 can be appropriately provided. In addition, since an image created by the first CPU 5 or second CPU 12 is displayed in a display area that gets unoccupied because of adjustment of the picture produced by the periphery monitoring system 19, the unoccupied display area can be effectively utilized.

(Modification)

The present disclosure is not limited to the above-mentioned embodiments, but can be modified or expanded as, for example, described below.

A description has been made of an application that deals with video data produced by any of the rear camera and side cameras of the periphery monitoring system 19, and switches a mode, in which a raw picture is displayed, and a mode in which a picture having guiding lines and HMIs appended is displayed. The present disclosure may be applied to any application that deals with any data. For example, before the first CPU 5 completes activation or when a fault occurs in the operation of the digital substrate 2, a simple screen image (i.e., a screen image that provides a relatively small amount of information and that is not limited to a picture produced by a camera) may be displayed. After the first CPU 5 has completed activation or when the operation of the digital substrate 2 has normally been restored, a detailed screen image (i.e., a screen image that provides a relatively large amount of information) may be displayed.

The present disclosure is not limited to a configuration in which the digital substrate 2 including the first CPU 5 and the power supply interface substrate 3 including the second CPU 12 are separated from each other, but may be applied to a configuration having the first CPU 5 and second CPU 12 mounted on the same substrate.

A configuration in which the first display unit 11 appended to the digital substrate 2 is omitted may be applied. A configuration in which the first display unit 11 appended to the digital substrate 2 and the second display unit 18 appended to the power supply interface substrate 3 are used in common may be applied.

The numbers of pixels in the second embodiment are mere examples. Any numbers of pixels may be applied. The present disclosure is not limited to the magnification of video data; however, processing for minimizing video data may be carried out.

What is claimed is:

1. A data processing device comprising:
   a first controller that requires a first activation time elapsed from feeding operation power to the first controller and starting activation of the first controller until completing the activation of the first controller;
   a second controller that requires a second activation time, which is shorter than the first activation time, elapsed from feeding the operation power to the second controller and starting activation of the second controller until completing the activation of the second controller; and a data processor that switches a mode, in which data is processed, between a first processing mode for outputting a processing result of data without collaboration with the first controller, and a second processing mode for outputting a processing result of data in collaboration with the first controller, wherein the data processor processes data in the first processing mode after completing the activation of the second controller and before completing the activation of the first controller, wherein the data processor processes data in the second processing mode after completing the activation of the first controller, wherein the data processor processes data in the first processing mode after a fault occurs in the first controller, wherein the second controller is activated earlier than the first controller, wherein the activation of the first controller includes a first booting process carried out by the first controller in which the first controller reads out a program or an operating system, the activation of the first controller being completed once the first controller finishes reading out the program or the operating system, wherein the activation of the second controller includes a second booting process carried out by the second controller in which the second controller reads out a program or an operating system, the activation of the second controller being completed once the second controller finishes reading out the program or the operating system, wherein the activation of the second controller is initiated before the first controller starts the activation of the first controller, and wherein the activation of the second controller is finished before the first controller completes the activation of the first controller.

2. The data processing device according to claim 1, wherein the data processor processes data in the second processing mode after the fault in the first controller is resolved.

3. The data processing device according to claim 1, wherein the second controller switches between the first processing mode of the data processor and the second processing mode of the data processor, wherein the second controller determines whether the first controller completes activation and whether a fault occurs in the first controller, after the second controller completes activation, wherein the second controller switches the data processor into the first processing mode in a period during which the second controller determines that the first controller does not complete activation, wherein the second controller switches the data processor into the second processing mode after the second controller determines that the first controller completes activation, and wherein the second controller switches the data processor into the first processing mode after the second controller determines that a fault occurs in the first controller.

4. The data processing device according to claim 3, wherein the second controller determines whether a fault in the first controller is resolved, and wherein the second controller switches the data processor into the second processing mode after the second controller determines that the fault in the first controller is resolved.

5. The data processing device according to claim 3, further comprising:

a power supply management device that manages the operation power of the first controller; and a monitoring device that monitors input and output of a signal between the first controller and the power supply management device, wherein the second controller determines by inputting a monitoring result from the monitoring device whether a fault occurs in the first controller.

6. The data processing device according to claim 3, wherein a power supply management device outputs a reset command to the first controller in response to an inputted first reset signal, wherein the first controller resets the first controller itself in response to the reset command inputted from the power supply management device, and wherein the second controller outputs the first reset signal to the power supply management device so as to reset the first controller when the second controller determines that a fault occurs in the first controller and that the power supply management device is not required to be reset but the first controller is required to be reset.

7. The data processing device according to claim 5, wherein the power supply management device resets the power supply management device itself in response to an inputted second reset signal, wherein the first controller resets the first controller itself along with reset of the power supply management device, and wherein the second controller outputs the second reset signal to the power supply management device so as to reset both the power supply management device and first controller when the second controller determines that an a fault occurs in the first controller and that both the power supply management device and the first controller are required to be reset.

8. The data processing device according to claim 1, wherein, in the first processing mode, the data processor displays on a display device a picture, which is represented by video data, without appending additional data to the video data inputted from outside, and wherein, in the second processing mode, the data processor displays on the display device a picture, which is represented by the video data, with the additional data appended to the video data inputted from outside.

9. The data processing device according to claim 8, wherein the data processor adjusts a picture represented by the video data in response to an arrangement mode of the display device, and displays the picture on the display device.

10. The data processing device according to claim 8, wherein the data processing device adjusts a picture, which is represented by the video data, in response to a display performance of the display device, and displays the picture on the display device.

11. The data processing device according to claim 9, wherein when the data processor displays a picture, which is represented by the video data, on the display device in the first processing mode, the data processor displays the picture in a part of a display area in the display device, and displays an image, which is created by the first controller, in another part of the display area in the display device.

12. The data processing device according to claim 9, wherein when the data processor displays a picture, which is represented by the video data, on the display device in the second processing mode, the data processor displays the picture in a part of a display area in the display device, and displays an image, which is created by the second controller, in another part of the display area in the display device.

13. The data processing device according to claim 1, wherein the first controller is mounted on a first substrate,
wherein the second controller and the data processor are mounted on a second substrate other than the first substrate, and
wherein the first substrate is attachable to or detachable from the second substrate.

14. The data processing device according to claim 1, wherein the data processing device is mounted to a vehicle, and
wherein the first controller specializes in processing information data, and the second controller specializes in processing vehicular data.

15. A data processing device comprising:
a first controller that requires a first activation time from when operation power is fed to the first controller for completing activation of the first controller;
a second controller that requires a second activation time from when operation power is fed to the second controller for completing activation of the second controller, the second activation time being shorter than the first activation time; and
a data processor that switches a mode in which data is processed between a first processing mode wherein processing results are outputted without collaboration with the first controller and a second processing mode wherein processing results are outputted in collaboration with the first controller;
wherein operation power is fed to the second controller before operation power is fed to the first controller;
wherein activation of the second controller is completed before activation of the first controller is completed;
wherein the data processor processes data in the first processing mode after activation of the second controller is completed and before activation of the first controller is completed;
wherein the data processor processes data in the second processing mode after activation of the first controller is completed;
wherein the data processor processes data in the first processing mode in response to a fault occurring in the first controller;
wherein the activation of the first controller includes a first booting process carried out by the first controller in which the first controller reads out a program or an operating system, the activation of the first controller being completed once the first controller finishes reading out the program or the operating system;
wherein the activation of the second controller includes a second booting process carried out by the second controller in which the second controller reads out a program or an operating system, the activation of the second controller being completed once the second controller finishes reading out the program or the operating system;
wherein the activation of the second controller is initiated before the first controller starts the activation of the first controller; and
wherein the activation of the second controller is finished before the first controller completes the activation of the first controller.

16. The data processing device according to claim 1, wherein:
the first controller initiates a self-diagnosis process after completing the activation of the first controller; and
a result related to the self-diagnosis process is outputted to the second controller.

17. The data processing device according to claim 1, wherein:
the program or the operating system is executable after the first controller completes the activation of the first controller.

* * * * *